United States Patent [19]
Grot

[11] Patent Number: 5,707,755
[45] Date of Patent: Jan. 13, 1998

[54] PEM/SPE FUEL CELL

[75] Inventor: Stephen Andreas Grot, Henrietta, N.Y.

[73] Assignee: General Motors Corporation, Detroit, Mich.

[21] Appl. No.: 761,958

[22] Filed: Dec. 9, 1996

[51] Int. Cl.$^6$ .................................................. H01M 4/86
[52] U.S. Cl. .................................................. 429/40; 429/44
[58] Field of Search .......................... 429/40, 44, 30, 429/33, 34, 41

[56]  References Cited

U.S. PATENT DOCUMENTS

| | | | |
|---|---|---|---|
| 5,176,966 | 1/1993 | Epp et al. | 429/40 |
| 5,272,017 | 12/1993 | Swathirajan et al. | 429/33 |
| 5,300,206 | 4/1994 | Allen et al. | 429/44 |
| 5,492,778 | 2/1996 | Akagi | 429/40 |
| 5,523,177 | 6/1996 | Kosek et al. | 429/40 |
| 5,607,785 | 3/1997 | Tozawa et al. | 429/44 |

*Primary Examiner*—Bruce F. Bell
*Attorney, Agent, or Firm*—Lawrence B. Plant

[57]  ABSTRACT

A PEM/SPE fuel cell including a membrane-electrode assembly (MEA) having a plurality of oriented filament embedded the face thereof for supporting the MEA and conducting current therefrom to contiguous electrode plates.

9 Claims, 2 Drawing Sheets

PEM/SPE FUEL CELL

The Government of the United States of America has rights in this invention pursuant to contract No. DE-AC02-90CH10435 awarded by the United States Department of Energy.

TECHNICAL FIELD

This invention relates to PEM/SPE fuel cells and more particularly to such cells wherein the electrode surface of the membrane-electrode-assembly includes a plurality of oriented graphite/carbon filaments.

BACKGROUND OF THE INVENTION

Fuel cells have been proposed as a power source for electric vehicles and other applications. One such fuel cell is the PEM (i.e., Proton Exchange Membrane) fuel cell which is also known as a Solid Polymer Electrolyte (SPE) fuel cell. PEM/SPE fuel cells are well known in the art, and include a so-called "membrane-electrode-assembly" (MEA) comprising a thin, solid polymer membrane-electrolyte having a pair of electrodes (i.e., an anode and a cathode) on opposite faces of the membrane-electrolyte. The MEA is sandwiched between a pair of electrically conductive elements (i.e., electrode plates) which serve as current collectors for the electrodes, and contain a so-called "flow-field" which is an array of lands and grooves formed in the surface of the plate contacting the MEA. The lands conduct current from the electrodes, while the grooves between the lands serve to distribute the fuel cell's gaseous reactants (e.g., $H_2$ & $O_2$/air) evenly over the faces of the electrodes. A thin sheet of porous (i.e., about 80% voids) graphite/carbon paper is positioned between each of the electrode plates and the electrode faces of the MEA, to support the MEA where it confronts grooves in the flow field, and to conduct current therefrom to the adjacent lands. SPE or PEM membranes are well known in the art. Typical SPE membranes are described in U.S. Pat. Nos. 4,272,353 and 3,134,697, and in the Journal of Power Sources, Volume 29 (1990), pages 367-387, inter alia. SPE/PEM membranes are essentially ion exchange resins which include ionic groups in their polymeric structure, one ionic component of which is fixed or retained by the polymeric matrix and at least one other ionic component is a mobile replaceable ion electrostatically associated with the fixed component. The ability of the mobile ion to be replaced under appropriate conditions with other ions imparts ion exchange characteristics to these materials. One broad class of cation exchange, proton conductive resins is the so-called sulfonic acid cation exchange resin. In the sulfonic acid membranes, the cation ion exchange groups are hydrated sulfonic acid radicals which are attached to the polymer backbone by sulfonation. The preferred such resin is perfluorinated sulfonic acid polymer electrolyte in which the entire membrane structure has ion exchange characteristics. Such proton conductive membranes may be characterized by monomers of the structures:

$$CF_2=CFOCF_2CF_2SO_3H \text{ and}$$

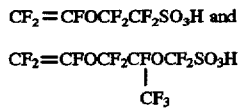

One commercial sulfonated perfluorocarbon, proton conductive membrane suitable for PEM/SPE fuel cells is sold by E.I. DuPont de Nemours & Co. under the trade designation NAFION®. Another is sold by the Gore Company under the tradename Gore Select™.

The anode and cathode electrodes on the opposing sides of the PEM/SPE membrane typically comprise finely divided carbon particles having a catalyst on the surfaces thereof and a proton conductive resin intermingled with and forming a matrix/binder for the particles. The proton conductive material typically comprises the same polymer as makes up the electrolyte (e.g., NAFION®) One such membrane-electrode-assembly and fuel cell is described in U.S. Pat. No. 5,272,017 issued Dec. 21, 1993 and assigned to the assignee of the present invention.

It is also known to assemble a plurality of individual PEM fuel cells into a multi-cell stack wherein a plurality of the membrane-electrode-assemblies are aligned face to face in electrical series while being separated one from the next by an impermeable, electrically conductive electrode plate, known as a bipolar electrode/plate. The bipolar plate electrically conducts current between the anode of one cell and the cathode of the next adjacent cell in the stack. One face of the bipolar plate has a flow-field for distributing the $H_2$ gas across the surface of one electrode while the other face has a flow field for distributing $O_2$ gas across the surface of another electrode.

The graphite/carbon papers heretofore interposed between the electrodes and their associated electrode plates (1) comprise a mat of randomly oriented fibers, (2) are typically about 10 mils thick, (3) are quite expensive, (4) impede diffusion of the $H_2$ and $O_2$ through to their respective electrodes, (5) impede the outflow of $H_2O$ from the MEA, and (6) require that considerable pressure be applied to ends of the cell/stack to provide a good conductive interface with the electrodes and thereby reduce cell impedance.

SUMMARY OF THE INVENTION

The present invention contemplates a conventional PEM/SPE fuel cell which is modified as set forth hereafter to eliminate the use of carbon/graphite paper, and hence the drawbacks associated therewith. While the invention will be described herein in the context of a monocell PEM/SPE fuel cell, it is to be understood that it is equally applicable to multi-cell fuel cell stacks as well. The fuel cell has at least one cell that includes a membrane-electrode-assembly (MEA) comprising a pair of opposite polarity electrodes bonded to opposite sides of a PEM/SPE membrane electrolyte that separates the electrodes each from the other, and serves to conduct protons therebetween when discharging the cell. Each electrode has a first face that is exposed to a gaseous reactant in the cell. An electrically conductive contact element (i.e., electrode plate) has a second face that engages the first face of the electrode for conducting electrical current from the electrode. The second face includes a plurality of lands that engage the first face and define therebetween a plurality of grooves for distributing a gaseous reactant (e.g., $H_2$ or $O_2$) substantially uniformly across the first face other than where the lands engage the first face. The lands will preferably have a width between about 2 mils and about 10 mils where the lands contact the MEA, while the grooves will be about 20 mils to about 50 mils deep and have a width of about 20 mils to about 100 mils. In accordance with the present invention, the carbon or graphite papers that would normally be used between the MEA and the contact elements are eliminated, and in their stead a plurality of long, oriented, electrically conductive filaments are embedded longitudinally in the first face of the electrode. While the filaments may be completely embedded in the face, preferably they will only be partially embedded in the face so as to leave longitudinal portions of the filaments exposed above, and standing in relief from, the first face.

The filaments are preferably imbedded in the face of the electrode to between about 10% to about 90% of the filament's thickness as measured by their diameter. The filaments are long enough to extend across a plurality of the lands in a direction transverse the direction of the lands and grooves. Preferably, the filaments will be long enough to span the width of the cell (i.e., transverse the direction of the lands). The filaments (a) contact the lands for conducting current to the lands from regions of the electrode that are opposite and confront the grooves, and (b) prevent the MEA from being pushed into or otherwise invading the grooves. The filaments will preferably comprise carbon and graphite because, in addition to being electrically conductive, they are also lightweight, strong, and resistant to the corrosive environment of the cell. However, other less practical materials, e.g., noble metals, could also be used. Depending on the thickness of the electrode to which they are applied, carbon/graphite filaments will vary in diameter from about 2 μm (i.e., micrometers) to about 20 μm, and will preferably be about 5 μm to about 10 μm. The filaments will preferably have a loading factor, or density, of at least about 250 filaments/lineal inch (i.e., in the direction normal to the length of the filament) to about 1000 filaments/lineal inch, and most preferably about 300 to about 500 filaments/lineal inch. While monofilaments are preferred, a plurality of filaments may be twisted or plaited into strands before being embedded in the electrode face.

BRIEF DESCRIPTION OF THE DRAWINGS

The present invention will be better understood when considered in the light of the following detailed description of a specific preferred embodiment thereof, which description is given hereafter in conjunction with the several drawings in which.

DESCRIPTION OF THE PREFERRED EMBODIMENT

Figure 1:
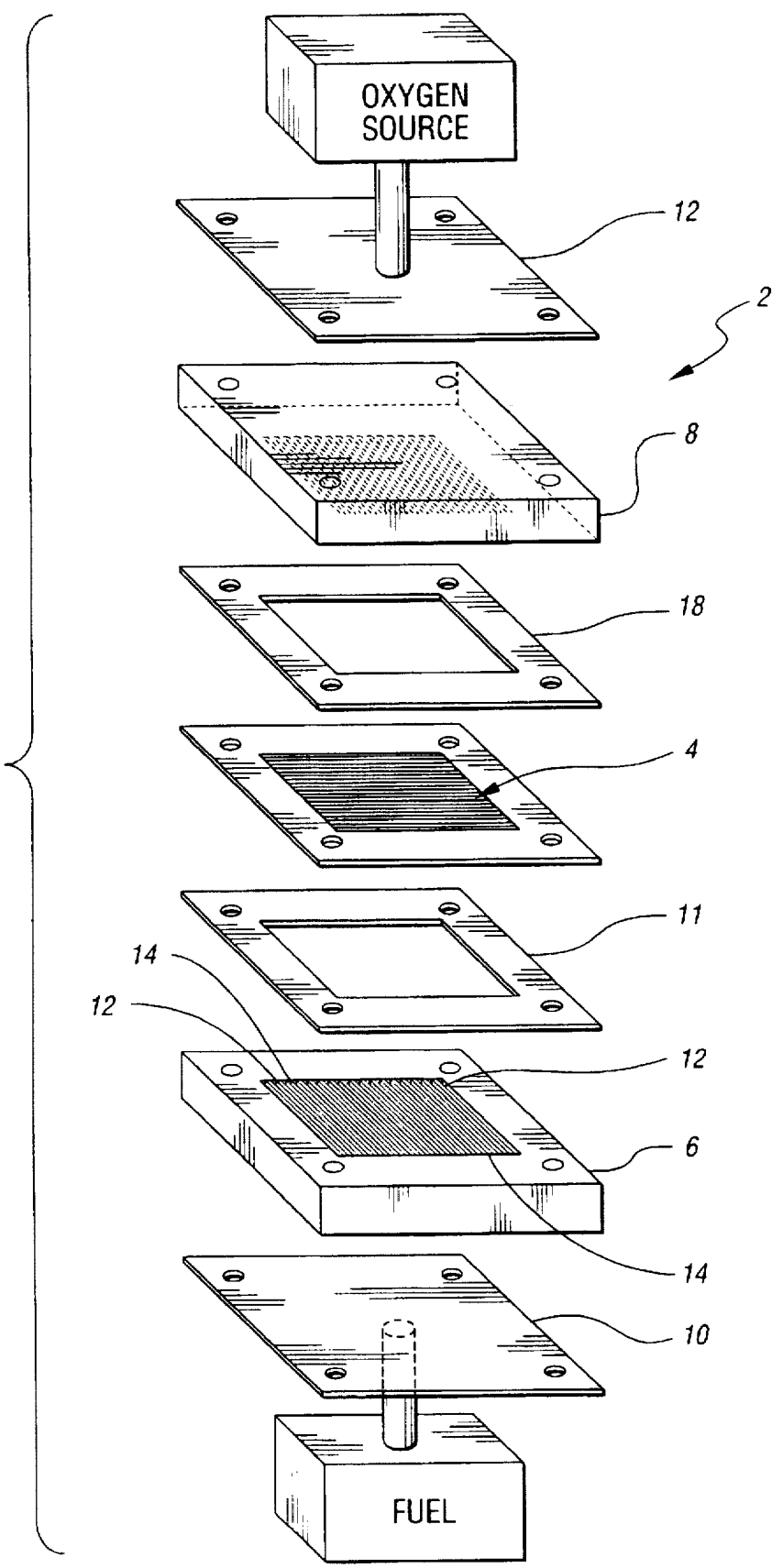
FIG. 1 is an exploded, isometric view of a single cell, PEM fuel cell in accordance with the present invention.

FIG. 1 depicts a monocell, PEM/SPE fuel cell 2 having a membrane-electrode-assembly 4 (MEA) sandwiched between a pair of electrically conductive electrode elements/plates 6 and 8. The plates 6 and 8 may comprise carbon, graphite or corrosion resistant metals. The invention, however, is equally applicable to fuel cell stacks which comprise a plurality of single cells arranged in series and separated from each other by bipolar electrode plates which are well known in the art. MEA 4, and electrode plates 6 and 8, are clamped together between stainless steel end plates 10 and 12. The electrode plates 6 and 8 each contain a plurality of lands 13 defining a plurality of grooves 14 which make up a so-called "flow-field" for distributing reaction gases (i.e., $H_2$ and $O_2$) to opposite faces of the MEA 4. With bipolar electrode plates, a flow field is formed on both sides of the plate, one for the $H_2$ and the other for the $O_2$. Nonconductive gaskets 11 and 18 provide seals and electrical insulation between the several components of the fuel cell 2. Insulated bolts, not shown, extend through the holes at the corners of the several components to clamp the assembly together.

Figure 2:
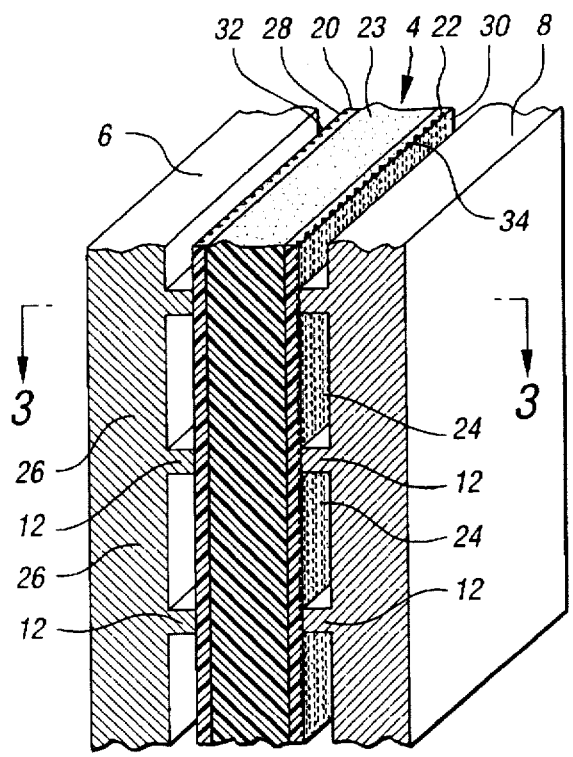
FIG. 2 is an enlarged, sectional, isometric view of the cell of FIG. 1.
Figure 3:
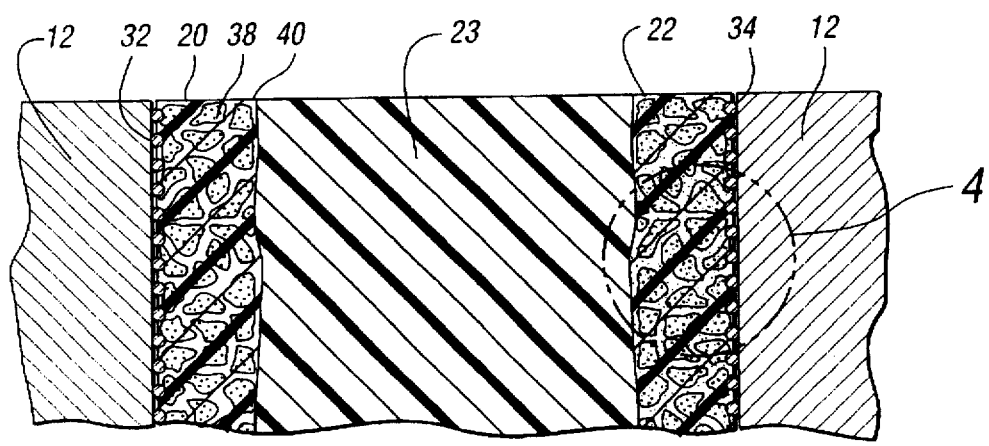
FIG. 3 is magnified, sectional view of the in the direction 3—3 of FIG. 2.
Figure 4:
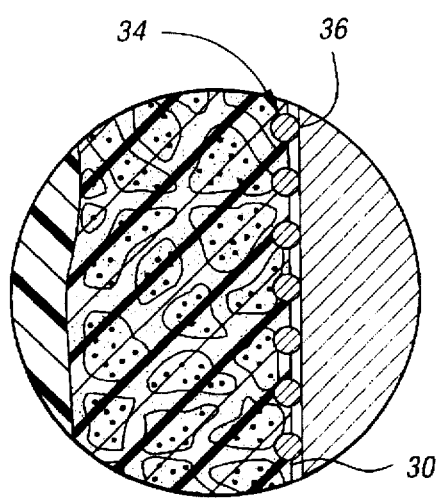
FIG. 4 is a megamagnified view of site 4 on FIG. 3.

FIGS. 2–4 are magnified portions of the cell 2, and show anode and cathode electrodes 20 and 22 on opposite sides of the MEA 4 and separated from each other by a solid polymer membrane-electrolyte 23. Polymers suitable for such membrane-electrolytes are well known in the art, and are described in such as U.S. Pat. Nos. 5,272,017 and 3,134,697, in the Journal of Power Sources, Volume 29 (1990) pages 367–387 and elsewhere in the patent and non patent literature. The composition of the SPE/PEM membrane 23 is not itself part of the present invention and may comprise any of the proton conductive polymers conventionally used in this application including the perfluorinated sulfonic acid polymers such as NAFION®, as well as other membranes such as Gore Select™ by the Gore Company. The polymer may be the sole constituent of the membrane or may be carried in the pores of another material. Similarly, the composition of the electrodes 20 and 22 is not itself part of the present invention, but rather may be any of the electrode materials conventionally used to make MEAs. In this regard, the electrode material may comprise catalyst-coated carbon or graphite particles 38 embedded in a polymer binder 40 which, like the polymer membrane 23, is a proton conductive material. Preferably, the polymer binder 40 will comprise the same proton exchange material as the membrane 23, but need not necessarily be so. Such electrodes will typically have a catalyzed carbon/graphite 38 loading between about 60% to about 80% by weight and the balance polymer binder 40. Alternatively, the electrode material may comprise 95% by weight fine platinum powder in a polytetrafluroethylene binder comprising 5% by weight of the electrode material. The lands 13 on the electrode plates 6 and 8 press up against the electrodes 20 and 22 respectively to support the MEA 4 therebetween and collect current from the electrodes 20 and 22. Oxygen (e.g., as air) is supplied to the cathode side of the MEA 4 via grooves 24 defined by the lands 13, while hydrogen is supplied to the anode side of the MEA 4 from a storage tank or reformer via grooves 26. Where a fuel cell stack is involved, suitable piping and manifolding is employed to supply the $H_2$ and $O_2$ simultaneously to all of the cells. Each of the electrodes 20 and 22 has a face 28 or 30 which is engaged by the lands 12 and which confronts the grooves 24 and 26 for exposure to the reactant gases $H_2$ and $O_2$.

In accordance with the present invention, a plurality of substantially unidirectionally oriented, electrically conductive filaments 32 and 34 are embedded longitudinally (i.e., lengthwise) in each of the faces 28 and 30, respectively. The filaments 32 and 34 may be completely embedded in the faces, but preferably will be embedded only from about 10% to about 90% of their thickness (i.e., diameter) such that at least a longitudinal portion 36 thereof is exposed on, and stands in relief from, the face 28 and 30 of the electrodes 20 and 22 so as to directly contact the lands 13. As best shown in FIG. 2, the filaments 32 and 34 are oriented transverse the direction of the lands 13 so as to provide a bridge between the lands 13 for supporting the MEA 4 therebetween and preventing the MEA 4 from invading the grooves 24 or 26 when a ΔP exists between the pressures in the grooves 24 and 26. At the same time, the filaments 32 are in good electrical contact with both the catalyzed material of the electrodes 20 and 22 confronting the grooves 24 and 26 and the lands 13, and accordingly serve as a means for conducting electric current from the groove-confronting regions of the electrode to the lands 13, and hence to the electrode plates 6 and 8.

MEAs useful with the present invention will have an overall thickness (i.e., between the faces 28 and 30) of about 2 mils to about 6 mils. Of this overall thickness, the thickness of the membrane 23 will vary from about 1 mil to about 5 mils, and the thickness of each electrode will vary from about 5 μm to about 30 μm. The highly oriented (e.g., unidirectional) electrically conductive filaments 32 will preferably comprise carbon or graphite which is conductive, lightweight, corrosion resistant and has high tensile strength. The filaments will have a thickness (i.e., diameter) of about 2 μm to about 20 μm, and will preferably extend substantially the full width of the MEA so as to contact most, if not all, of the lands in its associated flow field. Alternatively, shorter filaments could be used when arranged in longitudinal overlapping fashion with other such shorter filaments to span the entire width of the MEA (i.e., measured perpendicular to the direction of the lands), so long as each filament is long enough to traverse a plurality of lands 13 on either side of a given groove 14. Carbon/graphite filaments seen to be suitable with the present invention are commercially available from (1) Amoco Corporation under the tradename ThermalGraph™ DKD X, (2) the Cordec Corporation, and (3) RK Carbon Fibers Ltd. under the tradename RK30 Continuous Fibre™.

MEAs 4 may have the highly oriented, conductive filaments 32 applied to their faces in a number of ways. For example, the filaments 32 may be applied to the faces 28 and 30 of the electrodes 20 and 22 using a "decal" method. In this regard, a ribbon comprising a plurality of the filaments side-by-side is laid atop a temporary carrier, made of KAPTON® or the like. A mask is laid atop the filaments which mask has an opening therein that defines the area of the MEA 4. A slurry or ink of the catalyzed carbon, polymer binder and a suitable solvent is spread into the opening in the mask to the desired thickness, as by squeegeeing, doctor-blading, screening, or any other well known technique for laying down thin film. Thereafter, the mask is removed and the coated carrier (i.e., the decal) placed in an oven to evaporate the solvent and leave the catalyzed carbon dispersed throughout the binder matrix with the conductive filaments 32 embedded in the surface thereof. Thereafter a decal is positioned on each side of a separator membrane 23, and the entire assembly hot-pressed to bond the electrodes 20 and 22 to the membrane 23. For MEAs 4 utilizing NAFION® as the proton conducting polymer, hot-pressing will typically be effected at a temperatures of about 150° C. to about 200° C. and pressures of about 200 to about 1000 psi. After pressing, the KAPTON® carrier members are simply peeled off leaving the filaments 32 exposed on and standing in relief from the faces 28 and 30 of the electrodes 20 and 22. In another variation the electrode material may first be applied to the opening in the mask, and the filaments subsequently pressed into the exposed surface of the electrode material before curing/drying the film. The KAPTON® is then removed and the electrode hot pressed to the membrane such that the filaments are on the exterior face. Alternatively, MEAs 4 having faces 28 and 30 containing highly oriented filaments 32 can be made by first forming the decal as discussed above, but without the filaments and then hot-pressing the electrodes to the membrane 23. Thereafter, the oriented filaments are laid atop the faces 28 and 30 of the electrodes and hot-pressed into such faces. The temperature and pressure required to hot press the filaments into the electrodes will depend on the nature of the proton conductive binder in the electrodes, but for NAFION® will be about 104° C. to about 149° C. at pressures of about 50 psi to about 500 psi. The depth of penetration of the filaments into the faces of the electrodes can be controlled by the use of appropriate stops on the press which limit the extent to which the hot-pressing platens can close onto the MEA. Alternatively, continuous strips of MEA having highly oriented filaments embedded in their surfaces may be made by feeding first and second ribbons of highly oriented filaments into the nip of a pair of heated coacting rollers while simultaneously feeding a strip of the MEA between the ribbons so as to form a continuous strip of MEA with filaments attached. Preheating the MEA and/or filaments prior to feeding them between the rollers is seen to be desirable to insure that the binder polymer is softened sufficiently to embed the filament therein in the brief period that the filaments and MEA are between the coacting rollers.

Cells designed for use with the present invention will preferably avoid having a land on one electrode plate opposite a groove on the next adjacent electrode plate so as to prevent the MEA 4 from being pushed into such groove by such opposing land. Hence, the cell design will preferably be such that the lands 13 of one electrode plate will oppose the lands 13 of the next adjacent electrode plate as illustrated in FIG. 2. Alternatively, the lands 13 of one electrode plate could be oriented at an angle (e.g., 45 degrees) to the lands on the next adjacent electrode plate so that the MEA sandwiched therebetween is held at a plurality of individual sites where the lands directly oppose each other rather than being held along the full length of lands which oppose each other along their full length as shown in FIG. 2.

While the invention has been disclosed in the context of a specific embodiment thereof it is not intended to be limited thereto, but rather only to the extent set forth hereafter in the claims which follow.

I claim:

1. In a Proton Exchange Membrane/Solid Polymer Electrolyte (PEM/SPE) fuel cell having at least one cell comprising a pair of opposite polarity electrodes each having a first face for exposure to a gaseous reactant, a membrane electrolyte bonded to and interjacent said electrodes for conducting protons between said electrodes when discharging said cell, and an electrically conductive contact element having a second face engaging a said first face for conducting electrical current from said electrode through said first face, said second face comprising a plurality of lands engaging said first face and defining a plurality of grooves therebetween for distributing a gaseous reactant substantially uniformly across said first face, the improvement comprising a plurality of electrically conductive filaments embedded longitudinally in said first face, said filaments extending across a plurality of said lands in a direction transverse said lands and grooves.

2. A PEM/SPE fuel cell in accordance with claim 1 wherein said filaments are only partially embedded in said first face so as to leave longitudinal portion of said filaments exposed above, and standing in relief from, said first face.

3. A PEM/SPE fuel cell in accordance with claim 2 wherein said filaments are imbedded in said first face to between about 10% to about 90% of the filaments thickness.

4. A PEM/SPE fuel cell in accordance with claim 1 wherein said lands extend in a first direction, said second face has a width measured in a second direction which is approximately perpendicular to said first direction, and said filaments are at least about as long as said width.

5. A PEM/SPE fuel cell in accordance with claim 1 wherein said filaments are selected from the group consisting of carbon and graphite.

6. A PEM/SPE fuel cell in accordance with claim 5 wherein said filaments have a diameter between about 2 μm and about 20 μm.

7. A PEM/SPE fuel cell in accordance with claim 5 wherein said first face includes at least about 250 filaments per linear inch.

8. A PEM/SPE fuel cell in accordance with claim 1 wherein a plurality of said filaments are stranded.

9. A PEM/SPE fuel cell in accordance with claim 1 wherein said lands have a width between about 2 mils and about 10 mils, and said grooves have a width of about 20 mils to about 100 mils.

* * * * *